United States Patent [19]
Feng

[11] 3,845,699
[45] Nov. 5, 1974

[54] COMPACT SINGLE LENS REFLEX VIEWING SYSTEM FOR CAMERAS

[76] Inventor: Chung Liao Feng, 16 Seven Springs Rd., Radnor, Pa. 19087

[22] Filed: May 1, 1972

[21] Appl. No.: 249,070

[52] U.S. Cl. ................................................ 95/42
[51] Int. Cl. ........................................... G03b 19/12
[58] Field of Search ...................... 95/42; 350/291

[56] References Cited
UNITED STATES PATENTS

| 3,127,809 | 4/1964 | Denk ....................................... 95/42 |
| 3,180,241 | 4/1965 | Mikusch ................................. 95/42 |
| 3,534,671 | 10/1970 | Yamaguchi ............................. 95/42 |

*Primary Examiner*—John M. Horan

[57] ABSTRACT

This invention relates to the improvements to the single lens reflex viewing system used in cameras.

4 Claims, 4 Drawing Figures

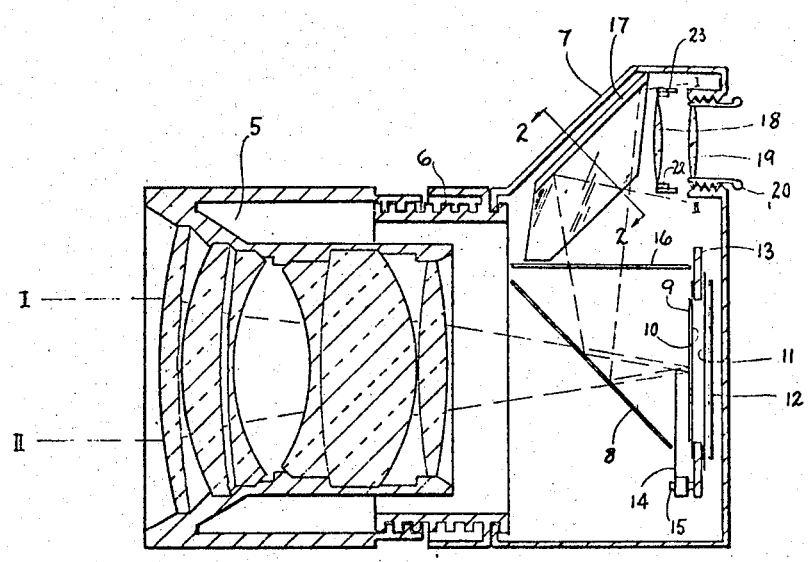
FIG 1
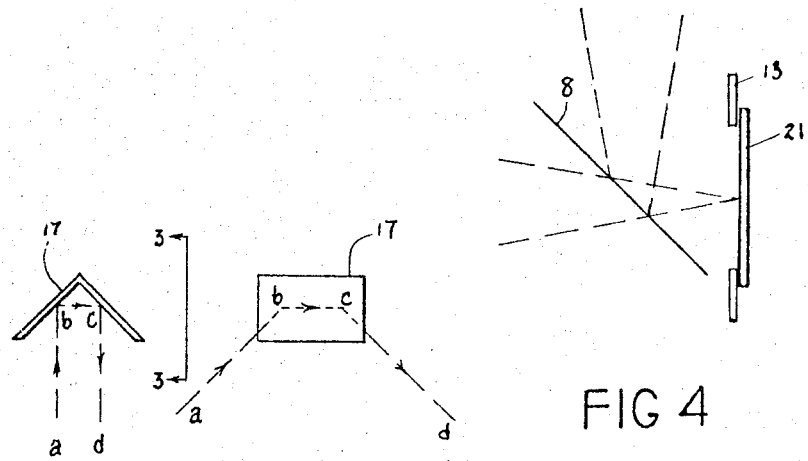
FIG 2    FIG 3
FIG 4

COMPACT SINGLE LENS REFLEX VIEWING SYSTEM FOR CAMERAS

SUMMARY OF THE INVENTION

The single lens reflex cameras have been popular for a number of years. The chief advantage over other types of cameras is the suitability at interchanging lenses. Both the view finding and the range finding functions can be made with lenses of any focal length and without the use of special linkages. There are also the advantages of being parallax free and being able to see lens blockage if any.

Accompanying these advantages are the inconveniences of the blackout during exposure and the camera bulk housing the optical path of the view finder.

It is the object of this invention to remove these inconveniences by a new and different viewing method which will still retain the advantages of the single lens reflex system. The viewing optical path of this invention is nested in part in the space between the lens and the film to allow a compact camera design.

Another object of this invention is to permit the viewing of the film during exposure. This means most of the working parts of the camera are directly monitored.

DRAWINGS

The preferred embodiments of this invention are described hereinafter and shown in the accompanying drawings.

FIG. 1 is the side view of a camera equiped with this viewing system. The sectional view is taken at the vertical plane of the optical axis.

FIGS. 2 and 3 are schematic drawings showing the left right reversal of rays not in the axis plane of FIG. 1.

FIG. 4 is a view showing the image being focused on the surface plane of the recording material.

DETAILED DESCRIPTION

FIG. 1 shows a camera equiped with the present invention with a conventional lens 5 in an interchangeable focusing mount 6 attached to the camera housing 7. Light entered lens 5 first passes through an one way reflecting device 8 which transmits light from left to right but serve as a reflecting surface for light arriving from the right. The one way reflecting device 8 can be in the form of a glass sheet with a very thin metalic coating on the right side surface. Typically a coating 100 angstroms thick, too thin to show any reflection from the glass side, may have a 20 percent reflection from the air side. After transmission through the one way reflecting device 8 the same light next reaches a reflecting surface 9 which is moved out of the way during exposure. The reflecting surface 9 may be attached to or formed as part of shutter curtain 10. A carefully controlled distance behind the reflecting surface 9 is the film surface 11 positioned by the pressure plate 12. The boundaries of the photograph are framed by the support 13 during exposure. At a distance the same as that between surfaces 9 and 11 but in front of surface 9 is a markee flag 14 which is mounted on a post 15 and can be rotated out of the optical path for storage. When the camera lens is correctly focused the light, after reflection by surface 9, travels from right to left and forms the image of the object being photographed in this plane of flag 14 except during exposure, when the image is formed on the film surface 11. Light after forming this image continues toward the left and is reflected by the one way reflecting device 8 upward through a one way transparent device 16. The construction of this one way transparent device 16 can be in the form of several one way reflecting sheets, each coated in the manner described for the one way reflecting device 8, stacked together with air space between sheets. The purpose of one way transparent device 16 is to prevent stray light entering ocular from further entering the film chamber. After passing through the one way transparent device 16 the light is again reflected this time by a corner mirror 17 before exiting through the ocular lenses 18 and 19 for viewing. Only a corner mirror, which may be replaced by a simple roof prism, is needed for the present device where a pentaprism is needed for the existing single lens reflex systems. The extra reflection inside a pentaprism may be considered as to correspond to the reflection at surface 9 in the present device. The differences between the corner mirror and the pentaprism illustrate in part the improvement in compactness obtainable with the present device.

The position of ocular lenses 18 and 19 may be adjusted by its threaded mount 20. This adjustment brings the plane of flag 14 into focus for individual eye sight. Marker flag 14 is also used to assist the viewer in locating the desired plane of focus. Its function is similar to that performed by the cross hairs of an existing arial image reflex system. Marker flag 14 on post 15 is shown in the upright position. Marker flag 14 may pivot about post 15 out of the way when not in use. The field lens 18 of the ocular may also move with its mount 22 sliding in a guide 23. By moving field lens 18 forward to increase the distance between it and the eye lens 19 of the ocular the plane in focus is shifted from that indicated by flag 14 to that occupied by film surface 11. The movement of field lens 18 of the ocular may be either as a part of the shutter movement or directly actuated by the shutter release. When the plane of flag 14 is in focus to the ocular the image formed by the taking lens 5 will appear to be sharp if formed at this plane. With the taking lens thus focused a sharp image will be formed at the film surface 11 when the reflecting surface 9 and the shutter curtain 10 are moved out of the way during exposure. Moving field lens 18 of the ocular forward to place surface 11 in the focus allows the viewing of the actual exposure of the film for slow shutter speeds.

FIGS. 2 and 3 are schematics showing the left right inversion of the image by the corner mirror 17. FIG. 2 is a view taken at line 2—2 of FIG. 1. FIG. 3 is a side view indicated by line 3—3. A light ray is shown starting at $a$ and reflected twice at $b$ and $c$ before reaching $d$. Light ray $a$–$b$–$c$–$d$ shows in FIG. 3 that the reflection by the corner mirror 17 is the same as that by a flat mirror placed at the apex of 17. Light ray $a$–$b$–$c$–$d$ shows in FIG. 2 that all which enters on the left exits on the right and the path is symmetrical with respect to the apex line. The corner mirror may be replaced by a 90° prism with the two sides made reflecting.

FIG. 4 shows the application of the present invention where the image by the taking lens 5 is formed on a diffused surface 21 instead of the aerial image described earlier. A diffused surface may be available under many different circumstances. One example is in the sheet film camera where the diffused surface 21 may represent the flap of a film holder. Other examples are the recording of images on the ferroelectric or the photoplastic materials. These are materials which are sensitized electrically during the time of exposure. Therefore the image to be recorded can be focused on the materials located in the position of surface 21 directly and viewed at all times. To make the recording it is only necessary to energize an electrical circuit.

While the invention has been described and illustrated by way of preferred embodiments and representative applications the spirit and scope of the invention are set forth in the appended claims.

What is claimed is:

1. A camera with compact viewing system comprising a camera body with objective lens, a one way reflector behind said lens, a shutter curtain with reflecting surface behind said reflector, a 90° corner reflector to receive light reflected by said curtain and first reflector, and an ocular.

2. A camera as defined in claim 1 with a one-way transparent window between the first reflector and the corner reflector.

3. A camera as defined in claim 2 further comprising means of adjustment for individual eyes, in the form of a moveable ocular and a marker flag.

4. A camera as defined in claim 3, the shutter being removable for recording systems in which the image of the object being photographed may be formed on a diffused surface for both viewing and exposure.

* * * * *